UNITED STATES PATENT OFFICE.

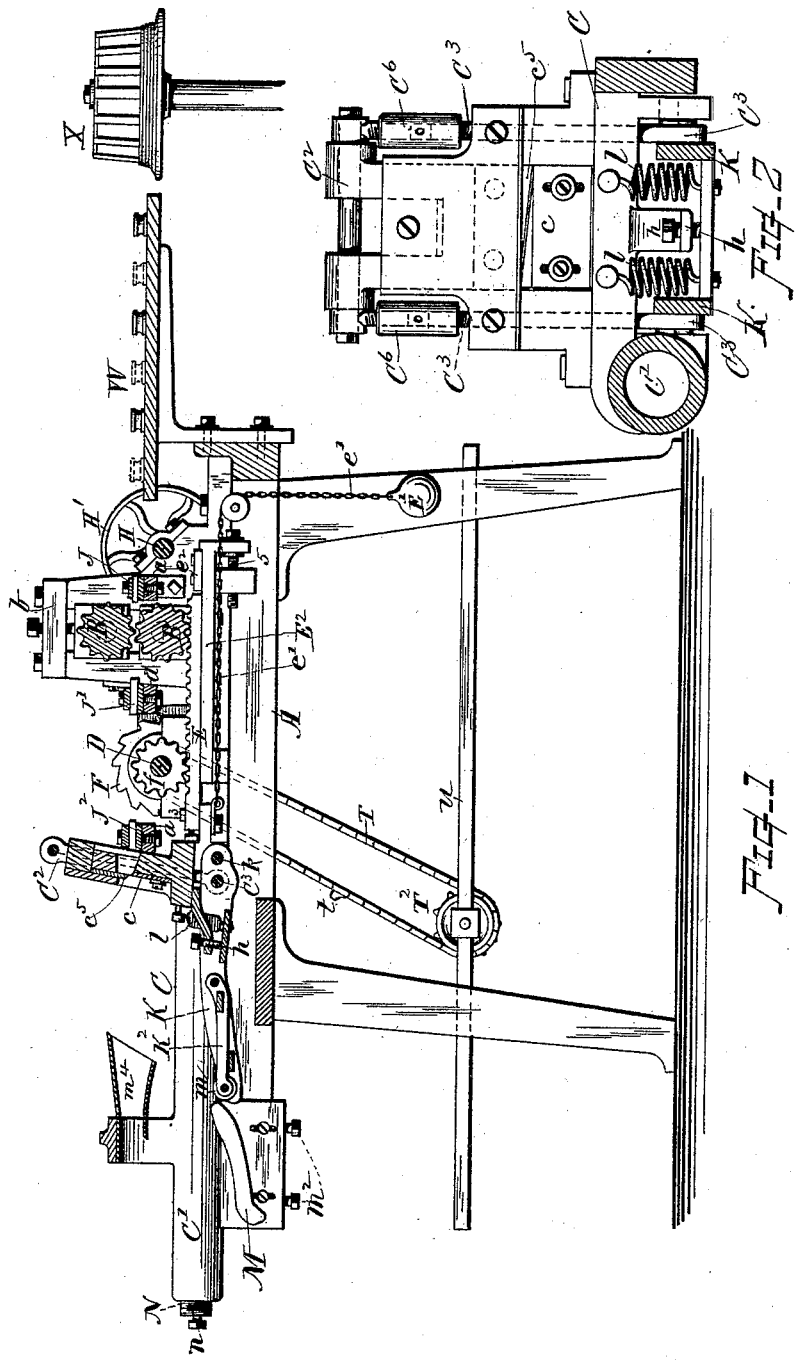

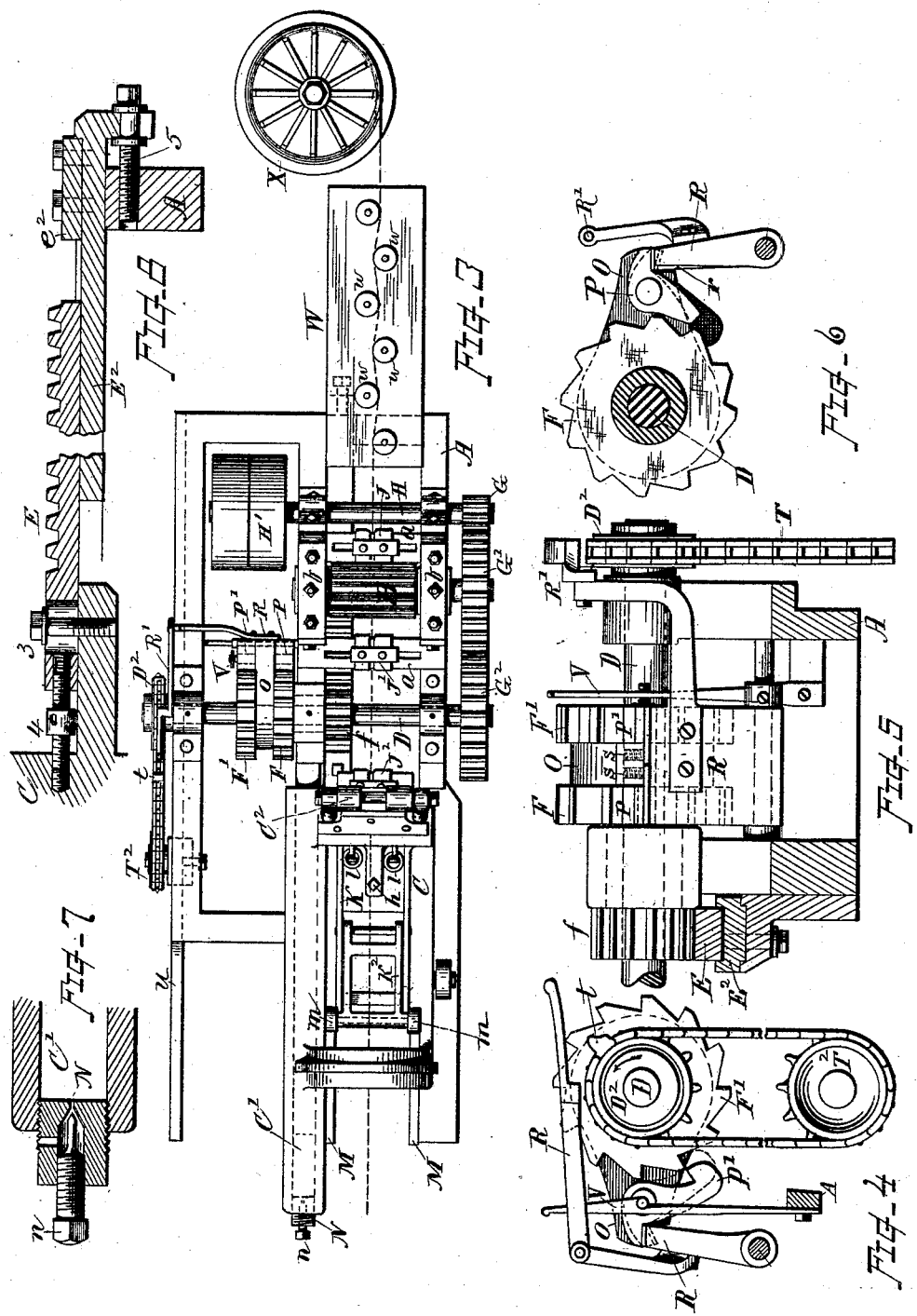

WILLIAM H. BROWN, OF WORCESTER, MASSACHUSETTS, ASSIGNOR TO CHARLES H. WOODCOCK, OF SAME PLACE.

MACHINE FOR CORRUGATING AND CUTTING WIRE.

SPECIFICATION forming part of Letters Patent No. 418,160, dated December 31, 1889.

Application filed October 19, 1889. Serial No. 327,547. (No model.)

*To all whom it may concern:*

Be it known that I, WILLIAM H. BROWN, a citizen of the United States, residing at Worcester, in the county of Worcester and State of Massachusetts, have invented certain new and useful Improvements in Machines for Corrugating and Cutting Wire, of which the following, together with the accompanying drawings, is a specification sufficiently full, clear, and exact to enable persons skilled in the art to which this invention appertains to make and use the same.

The objects of my present invention are, first, to provide an efficient mechanism by means of which wire can be corrugated and cut into pieces of any desired length; second, to provide, in a machine for the purpose specified, means for reciprocating the cutter-supporting carrier, causing the cutters to recede from the corrugating-rolls when making the cut in the wire; third, to afford, in a machine for the purpose stated, means whereby the action of the cutting mechanism can be regulated to be thrown into action at any desired interval in relation to the length of wire passed by the corrugating devices; fourth, to afford, in combination with corrugating and cutting mechanisms, means for adjusting the same in relation to each other to cause the cutting to be effected at any particular part of the bend or corrugation; fifth, to afford, in combination with corrugating and cutting mechanism, a system of guides for the wire and facilities for adjusting the guides laterally in relation to the rolls and cutters to relieve the parts in case of wear; sixth, to provide, in combination with wire-corrugating rolls and a reciprocating cutter-supporting carrier, an automatically-released clutch and air-cushioning devices for relieving the carrier from shock in its backward action. These objects I attain by mechanism the nature and operation of which is set forth in this specification.

Minor features of invention will be understood from the illustrations and following description, the particular subject-matter claimed being hereinafter definitely specified.

In the drawings, Figure 1 is a longitudinal vertical section of a machine embracing the features of my invention. Fig. 2 is a transverse section (drawn to larger scale) showing the head of the cutter-carrier and cutting mechanism. Fig. 3 is a top plan view of the machine. Fig. 4 is a rear view of the clutch mechanism. Fig. 5 is a side view of the same, and Fig. 6 is a view of the opposite end of the clutch mechanism. Fig. 7 shows the detail of the air-cylinder vent, and Fig. 8 shows the detail of the rack-adjusting devices.

In referring to parts, A denotes the frame; B, a pair of corrugated rolls mounted in suitable housings $b$, and furnished with means for adjusting the rolls more or less closely together.

C denotes the cutter-supporting carrier, which is mounted on the frame to have reciprocative action toward and from the rolls B, and is operated in its outward movement by means of a rack E and a pinion $f$, and in the opposite direction by a weight E′ and connecting chain or strap $e'$.

D indicates the main shaft, having the pinion $f$, clutches F and F′, and sprocket $D^2$ mounted thereon. The shaft D and rolls B are rotated by gears G, G′, and $G^2$ from the operating-shaft H, which is supported in suitable bearings on the frame and furnished with the tight and loose pulleys H′ for the driving-belt.

J, J′, and $J^2$ denote guides for the wire at front and rear of the rolls B and in front of the cutters. Said guides are preferably formed of steel plates secured to support-bars $a$, that extend across the frame and are adjustable for shifting the position of the wire to avoid wearing grooves in the rolls and cutters. One or more guides may be used on each bar, and one or any convenient number of strands of wire may be run through the machine at a time.

The carrier C is best made with an upright or slightly-inclined head, having guideways, within which there is mounted an upwardly and downwardly movable slide $C^2$, connected by link $C^3$ with a lever or vibrating frame K, fulcrumed beneath the head at $k$ and extending outward toward the latter end of the main frame A. The cutting-blades $c$ and $c^5$ are respectively fixed to the stationary part of the head and to the slide C². Springs *l* are provided for retaining the lever or frame K elevated, and an adjustable stop *h* is provided for limiting the upward action thereof. The links C³ are best made in two parts right and left threaded and united by turn-buckles or threaded sleeves C⁶, by which the length of the link can be adjusted to bring the cutting-blades into proper relation as they become worn away by work and sharpening.

M indicates cams or inclines fixed on the outer end of the frame A, by means of which the lever K is depressed and the cutters operated when the carrier C recedes from the rolls B, said inclines engaging with studs or anti-friction rolls *m* at the end of the lever. Said studs or engaging rolls *m* are arranged on a hinged part K², so that when the carrier moves back the studs *m* pass under the cams M. Then, when the outward limit is reached, the studs run from the ends of the cams M, and are lifted so that in their forward action they pass over the top of the cams, the hinged part K² allowing them to rise freely to the required height without reference to the position of the lever-frame K. The cams are best adjustably fixed on the frame by their attaching-bolts being passed through slots and setting-screws $m^2$ combined therewith, as indicated.

At one side the carrier C is provided with a cylinder C', that works on a plunger fixed to the frame A, affording an air-cushion for preventing shock on the return of the carrier after the clutch is released. In the end of the cylinder there is a vent N, provided with an adjusting screw-stopper *n*, (see Fig. 7,) by which the passage and escape of air from the interior can be regulated to vary the cushioning effect as required.

The clutch mechanism (see Figs. 3, 4, 5, and 6) comprises the toothed clutch-wheel F, connected by a sleeve with the pinion *f* and loose on the shaft D, the oppositely-toothed clutch-wheel F', fixed on the shaft D, and the arm O, disposed between the wheels F and F', loose on the shaft D, and having pivoted on its outer end a pair of pawls P and P', that are arranged to engage the teeth of the respective wheels F and F' when said pawls are released for action. The arm O and pawls P each have a shoulder that strikes or rests upon a swinging stop piece or dog R when the latter is at forward position, whereby the pawls are normally held out of engagement with the clutch-wheels. Suitable springs *s* (see Fig. 5) are combined with the arm O for forcing the pawls into engagement when the dog is thrown back from their shoulder. The side *r* of the dog R is cut away adjacent to the position of the pawl P, (see Fig. 6,) so that said pawl will be released slightly in advance of the pawl P', to insure its becoming well seated in the ratchet-teeth before the rotation of the arm O commences.

For throwing off the dog I employ a chain T, that runs on a sprocket or guide wheel D², mounted on the shaft D, which chain is provided with a ball or detent *t*, that engages with a shoulder on a tripping-arm R', connected with the dog R. As the detent passes over the wheel D², said arm is pressed back and swings the dog from the shoulder of the pawls and pawl-carrying arm, allowing the pawls to engage and the arm to revolve. After the detent has passed by, the dog R and trip-arm R' are returned to place by means of a spring or weight, so that the dog will catch the pawls P P' and arm O as they complete a revolution, and thereby automatically throw off the clutch. A latch V, that springs over a stud fixed in the pawl-pivot or connected with the arm O at the instant it reaches the stop, serves to prevent reaction or rebound of the arm and to hold the parts in a stationary position.

The chain T is best formed of detachable links, so that it can be made of greater or less length for varying the time at which the detent will come around and trip the clutch mechanism and putting into action the cutting apparatus at the required intervals.

The sprocket D² can be made of the same pitch as the corrugated rolls and to rotate at the same speed therewith. Then the pattern-chain T can be made the same length that the wire is to be cut. This, however, is not in all cases essential, as the mechanism may have any suitable proportional ratio between the pattern chain and rolls, equivalent results being attained.

One or more pulleys T² can be employed for supporting the slack of the chain T when a long chain is used, said pulley being adjustable on its support or frame U in any suitable manner.

The rack E for moving the cutter-carrier C is best connected with said carrier in a manner to be longitudinally adjustable in relation thereto, as by means of the slot and bolt 3 (see Fig. 8) and adjusting-screw 4, or by equivalent means. This adjustment affords facility for bringing the cutting-blades accurately to a position where they will cut the corrugated wire at a given part of the bend or corrugation, thus making the ends of all the pieces of wire of a uniform shape.

The bed E², on which the rack E slides, or the abutment $e^2$, against which the rack stops, is preferably made adjustable by means of the screw 5 or equivalent means. (See Fig. 8.) This adjustment affords facility for setting the teeth of the rack and pinion so that the teeth of the clutch-wheel F will properly receive the pawl P when it falls into engagement.

A suitable guide $m^4$ is best provided on the rear part of the cutter-supporting carrier to prevent the severed ends of wire from falling upon or interfering with the action of the cutter-operating mechanism.

W indicates a straightening mechanism for straightening the wire before it passes into the corrugating-roll. This is, in the present instance, composed of a series of offsetting rolls $w$, fixed on a suitable support; but, if desired, other form of straightening mechanism could be employed.

X indicates a reel or holder of any well-known form for supporting the coil of wire as it feeds to the machine.

In the operation the wire is led between the rolls $w$ to the guide J and to the pair of corrugated rolls B, by means of which it is bent, crinkled, or corrugated, thence through the guides J' and J² and between the cutters $c\,c^5$, it being fed forward by the action of the rolls B, that form the corrugations. When the detent $t$ of the chain T trips the clutch-dog R, the loose clutch-wheel F and pinion $f$ are locked to the revolving clutch-wheel F' by means of the pawls P and P', causing rotation of the pinion $f$, and thereby forcing backward the rack E and cutter-carrier C at the same speed, or substantially so, as the feed or movement of the wire, and as the engaging devices $m$ at the end of the lever or frame K pass under the cams M the upper cutting-blade $c^5$ is drawn downward by the links C³, and the wire is severed while the cutter-carrier is receding from the rolls B. When the clutch F and arm O have made one revolution, the pawls P and P' are thrown out by their shoulders striking on the dog R, thus leaving the pinion $f$ and wheel F free to turn backward on the shaft D, and the cutter-supporting carrier and rack is returned to its first position by the action of the weight E' and chain $e'$, such return being by an easy action and without shock, owing to the air-cushion in the cylinder C'. The rolls B continue to corrugate the wire, which runs forward at a regular speed, the cutting-off mechanism being ready to repeat the action when the detent $t$ is again brought around by the chain T to the trip-arm R'. Then another piece of the wire will be cut off by similar action, as will be understood.

What I claim as of my invention, to be herein secured by Letters Patent, is—

1. In a machine for the purpose specified, the combination of a pair of rotatable corrugating-rolls and a backwardly and forwardly movable cutting-off shear or cutters that recede from said rolls while performing the cutting-off action, as set forth.

2. In a machine for the purpose specified, the combination of the pair of corrugating-rolls, the pair of cutters, guides for directing the wire through the rolls and cutters, the cutter-supporting carrier capable of reciprocative action, means, substantially as described, for imparting movement to said carrier, the cams and levers that actuate the cutting-blade, the automatic stop-clutch, and an indicating pattern or chain having an indent that periodically throws the clutch and cutting mechanism into action, substantially as set forth.

3. In a machine for the purpose specified, the combination of the corrugating-rolls, the reciprocating cutter-supporting carrier, the cutter-operating lever fulcrumed on the carrier, linked to the slide of the movable cutter, and provided with engaging studs or rolls, the inclined stationary cams that engage the studs for actuating said cutter-operating lever, the rack attached to said carrier, the main shaft carrying a pinion that meshes with said rack, and the automatic stop-clutch for connecting said shaft and pinion, the swinging clutch-dog, the chain-wheel, and the traveling chain provided with a detent that actuates the trip of the clutch-dog, substantially as set forth.

4. In a machine for the purpose specified, the rack E, provided with an adjusting connection at 3 4, and the adjustable bed E², with stop $a^2$, in combination with the movable cutter-carrier C, pinion $f$, and corrugating-rolls B, substantially as set forth.

5. In a machine for the purpose specified, the movable cutter-supporting carrier provided with the air-cushioning cylinder, and a piston or plunger fixed to the frame and fitting within said cylinder, in combination with the automatic stop-clutch, the corrugating-rolls, the carrier-operating rack and pinion, and the returning-weight and its connections, as set forth.

6. In a machine for the purpose specified, the movable cutter-carrier having the upright head, the stationary cutter $c$, the movable cutter $c^5$ on slide C², the adjustable links C³, the lever-frame K, fulcrumed on the carrier-frame and connected to said links, the springs $l$, and adjustable stop $h$, in combination with the corrugating-rolls B, carrier-operating mechanism, and inclined cams M, as set forth.

7. The grooved supporting-bars $a$ and the guide-plates J J' J², laterally adjustable on the supporting-bars, in combination with the corrugating-rolls B and backwardly and forwardly movable cutter-supporting carrier and cutting-blades, for the purpose set forth.

8. In a machine for the purpose specified, the chain T, formed of detachable links and capable of extension or diminution, having one or more of said links provided with a detent $t$, and the chain-guiding wheels, one fixed on the rotating shaft, the other adjustable on its supporting bar or frame, in combination with the corrugating-rolls, the reciprocating carrier, and cutter-operating mechanism, the clutch and the clutch-releasing dog having a tripping-arm that is engaged by said detent, substantially as described, whereby variation in the intervals of action of the cutting operation can be effected, as set forth.

9. In a machine substantially as described, the rotatable shaft D, the toothed wheel F', fixed thereon, the pinion $f$, and toothed wheel F, attached together and mounted loose on the shaft, and the arm O, carrying the pivoted pawls P and P', in combination with the reciprocating cutter-supporting carrier and the swinging stop-dog fitted to engage shoulders on said pawls and arm, substantially as set forth.

10. The stop-dog R, having one part of its face r cut away to greater extent than the other, in combination with the pawls, clutch-wheels, main shaft, cutter-operating mechanism, and corrugating-rolls, as set forth.

Witness my hand this 16th day of October, A. D. 1889.

WILLIAM H. BROWN.

Witnesses:
    CHAS. H. BURLEIGH,
    CHARLES H. WOODCOCK.